Sept. 23, 1930.  W. HARPER, JR  1,776,504
VALVE
Original Filed Dec. 1, 1920   9 Sheets-Sheet 1

INVENTOR.
William Harper Jr,
BY
ATTORNEY.

Sept. 23, 1930.   W. HARPER, JR   1,776,504
VALVE
Original Filed Dec. 1, 1920   9 Sheets-Sheet  2

INVENTOR.
William Harper, Jr.
BY
ATTORNEY.

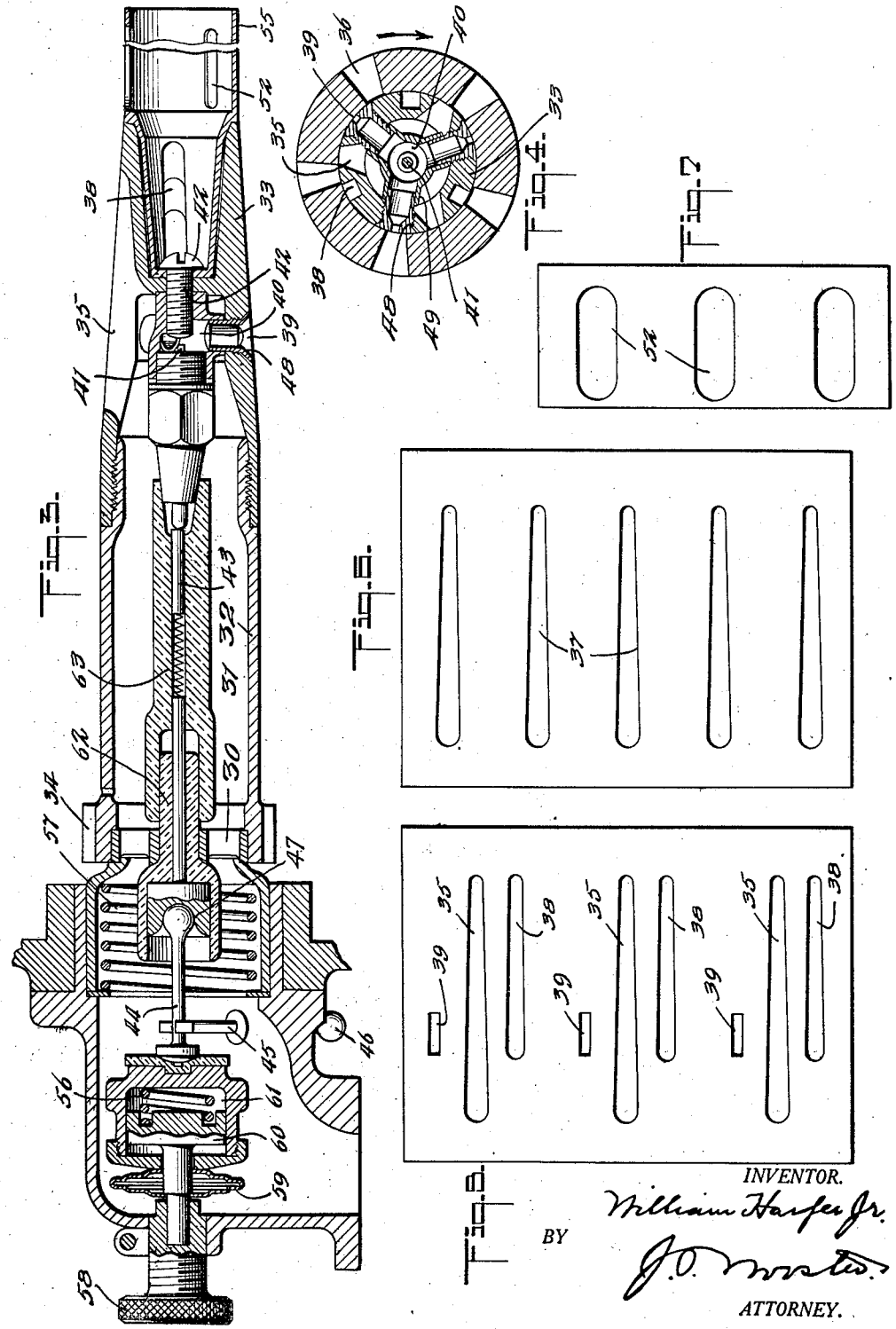

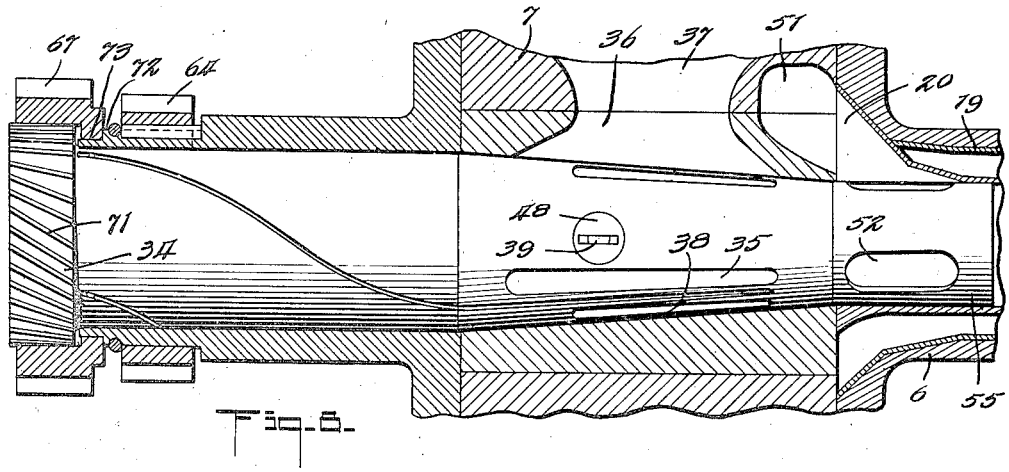
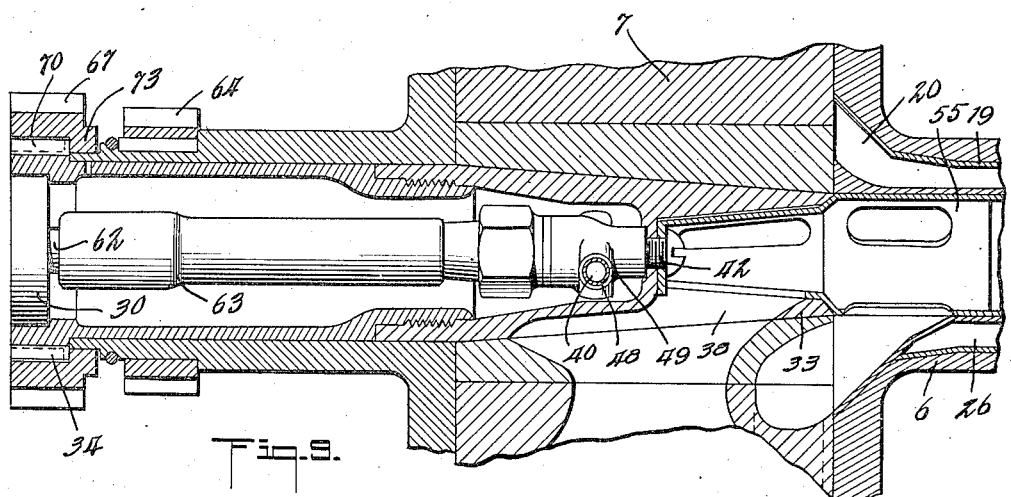
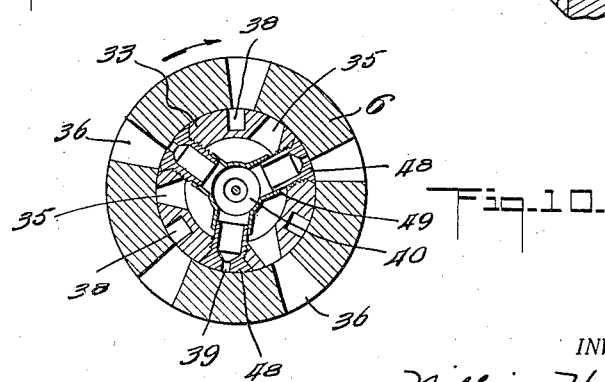

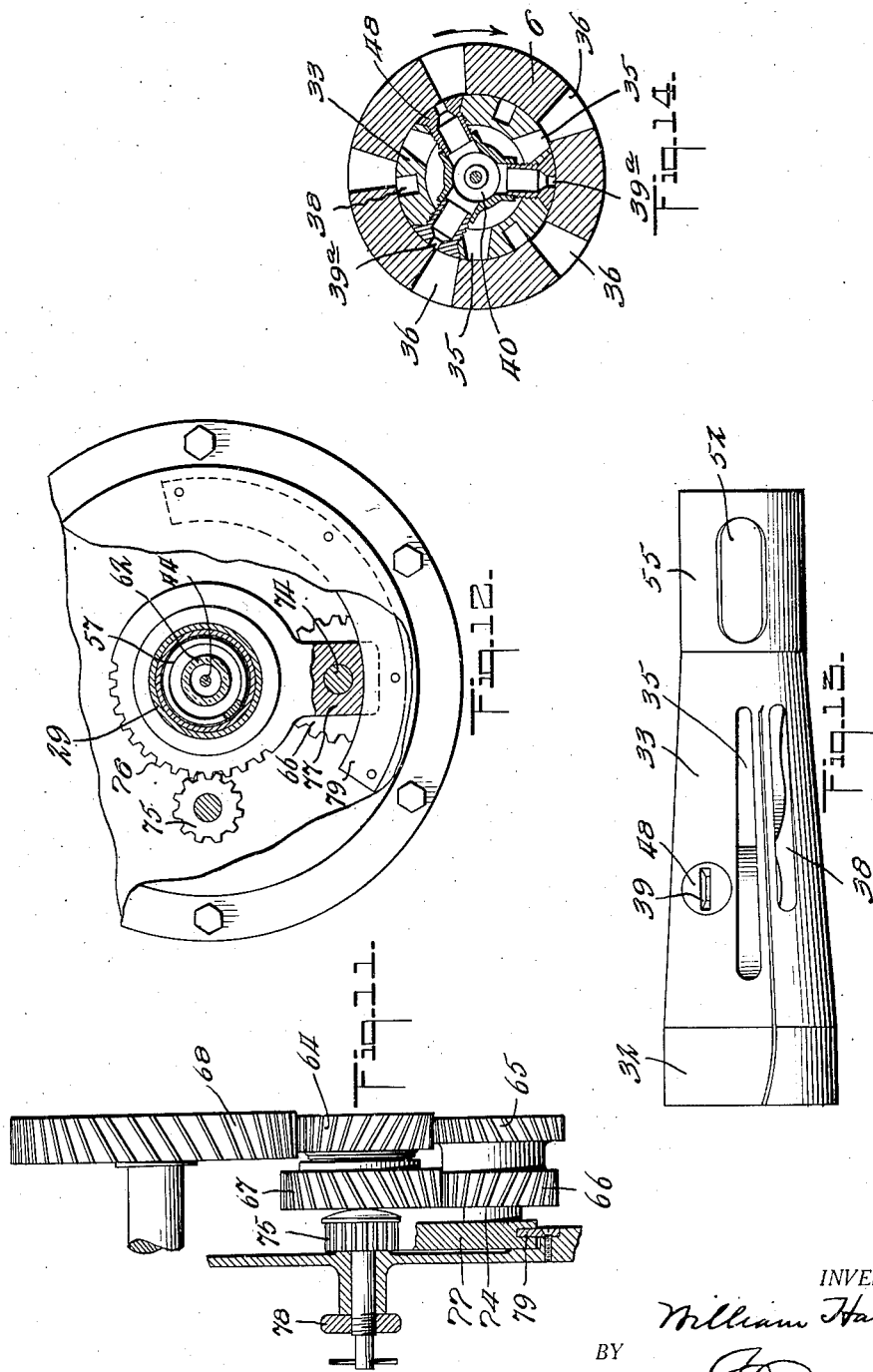

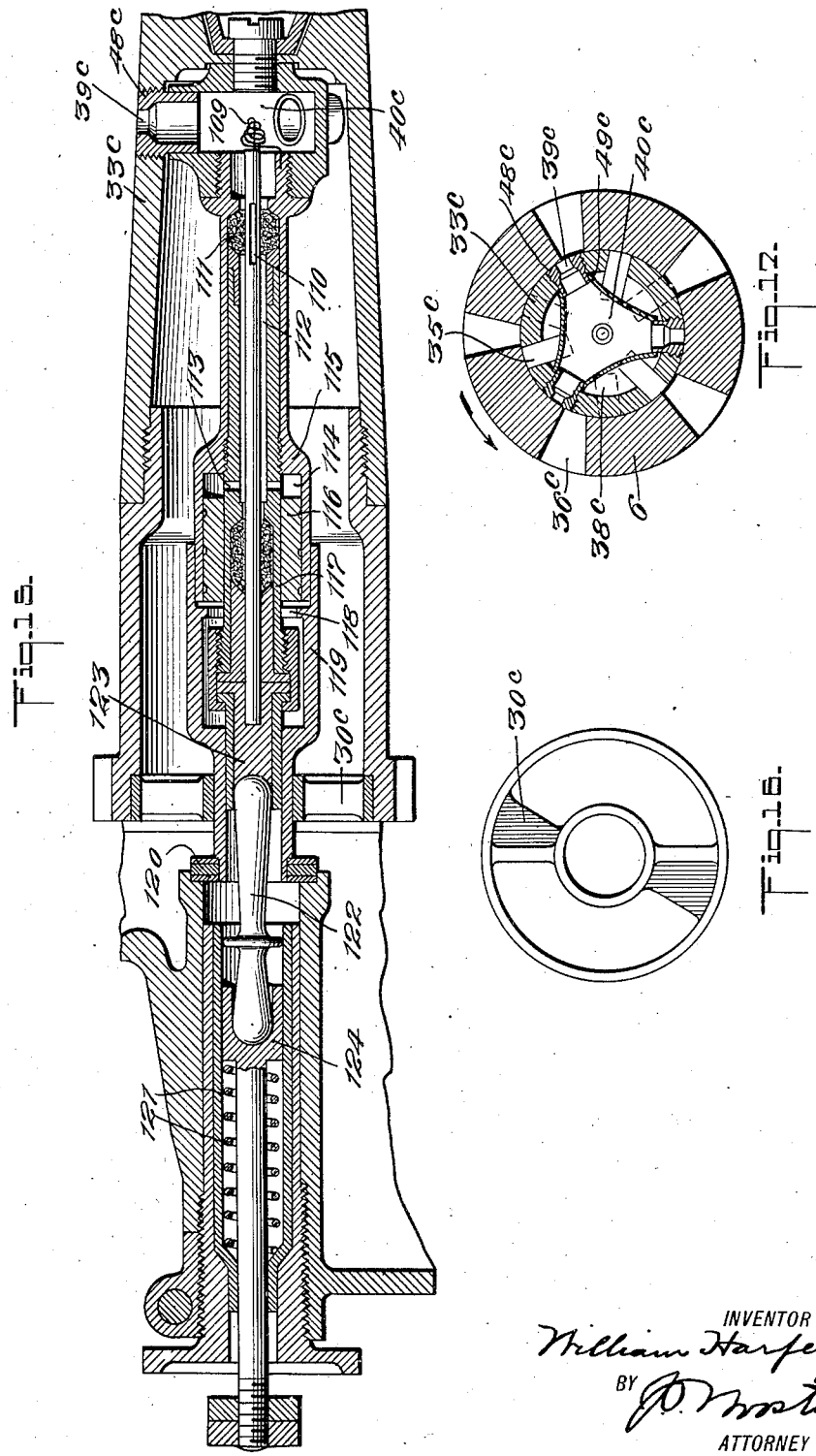

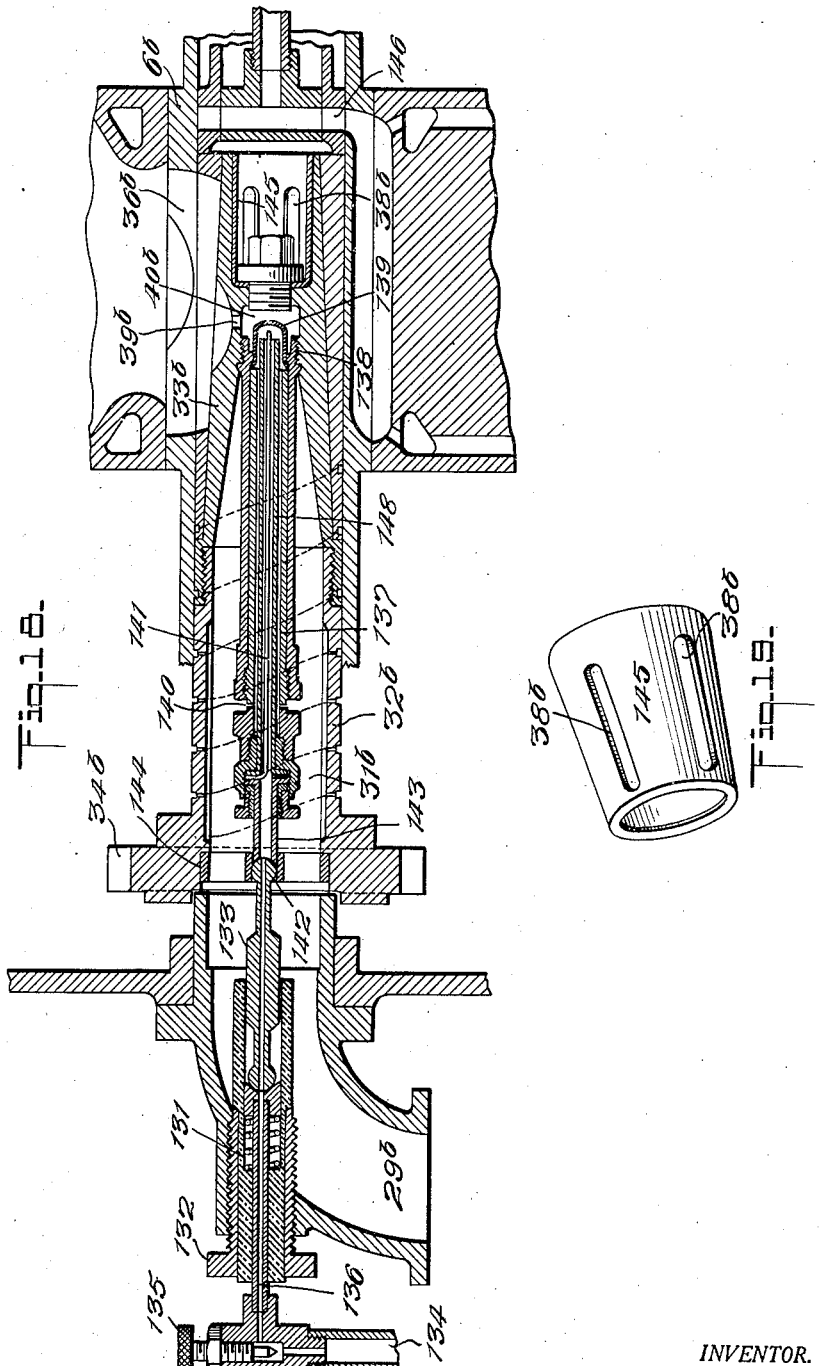

Sept. 23, 1930.  W. HARPER, JR  1,776,504
VALVE
Original Filed Dec. 1, 1920  9 Sheets-Sheet 8
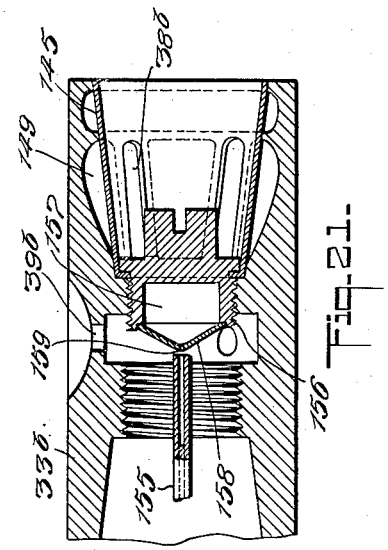
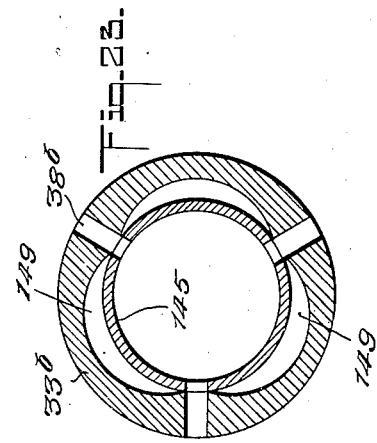
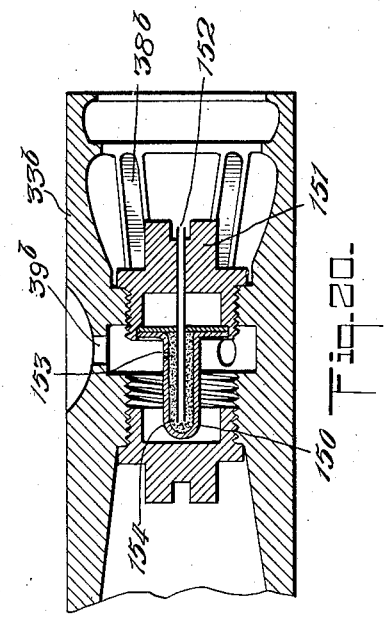
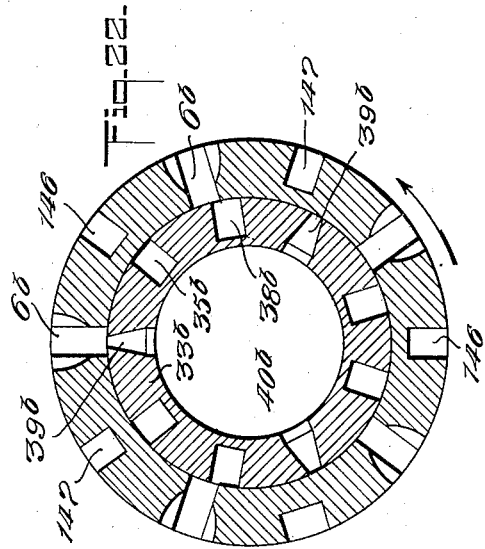
INVENTOR.
William Harper Jr.
BY
ATTORNEY.

Sept. 23, 1930.  W. HARPER, JR  1,776,504
VALVE
Original Filed Dec. 1, 1920   9 Sheets-Sheet  9
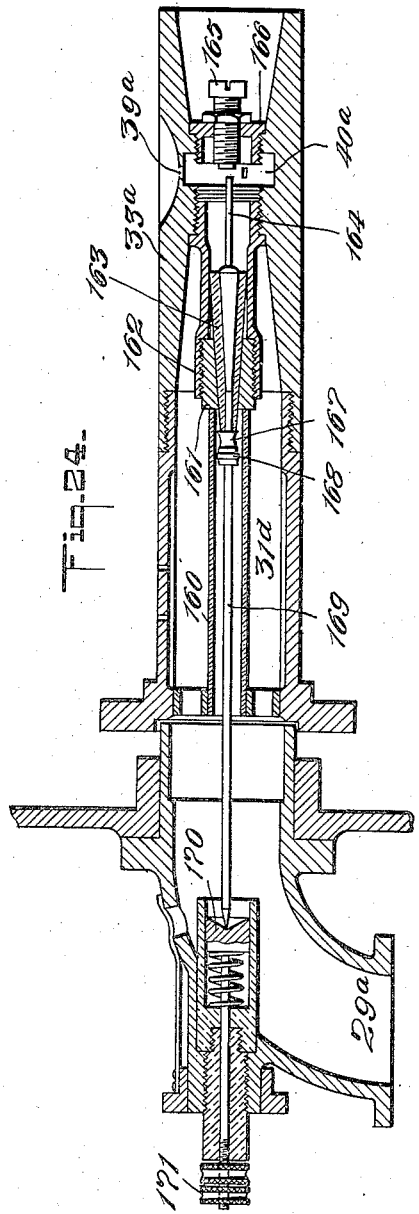
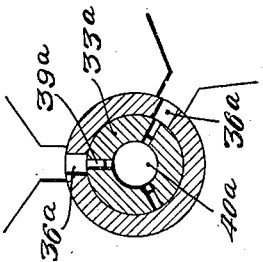
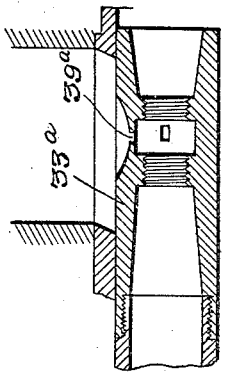
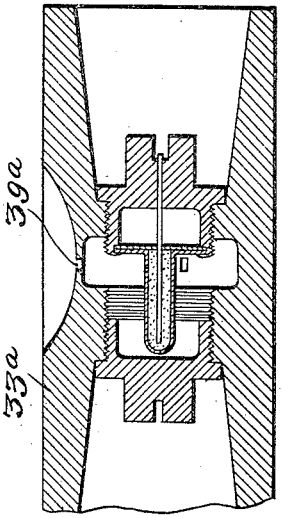
INVENTOR
William Harper, Jr.
BY
ATTORNEY Patented Sept. 23, 1930

1,776,504

UNITED STATES PATENT OFFICE

WILLIAM HARPER, JR., OF PORT WASHINGTON, NEW YORK, ASSIGNOR TO AMERICAN GAS TURBINE CORPORATION, OF NEW YORK, N. Y., A CORPORATION OF DELAWARE

VALVE

Original application filed December 1, 1920, Serial No. 427,475, now Patent No. 1,722,257, dated July 30, 1929, and in Great Britain July 18, 1921. Divided and this application filed April 13, 1927. Serial No. 183,592.

This invention relates to improvements in valves, especially those for internal combustion engines, and has for its object to provide a valve and driving mechanism therefor which is especially adapted for high speeds, and used with a wide variety of temperatures, the valve being adapted for very high temperatures of cross fire and regeneration.

This application is a division of my prior applications S. N. 427,475, filed Dec. 1, 1920, for Rotary reciprocating combustion engine, Patent #1,722,257, dated July 30, 1929; S. N. 485,499, filed July 18, 1921, for Combustion engine, Patent #1,722,258, dated July 30, 1929; S. N. 658,035, filed Aug. 18, 1923, for Internal combustion engine, Patent #1,722,259, dated July 30, 1929; S. N. 41,548, filed July 6, 1925, for Combustion engine and method of operating same, Patent #1,722,260, dated July 30, 1929; each of which discloses an entire engine including the valve.

According to this invention, a rotary valve is provided with transverse internally connected cross fire passages which are shaped and constructed to efficiently transfer the flame without quenching through substantially straight continuously heated paths. The valve is preferably tapered, driven, provided with means to longitudinally shift the same on increase in its driving torque, provided with means to adjust timing of the valve during rotation, and also provided with mechanism to prevent its jamming on its seat in case of rotation in the reverse direction from said shifting means.

Fig. 3 is a longitudinal section through the valve, sleeve, and its balancing or cushioning means.

Fig. 4 is a cross section through the shaft and valve showing the heat energy transfer ports.

Fig. 5 is a development of the valve.

Fig. 6 is a development of the shaft ports.

Fig. 7 is a development of the auxiliary exhaust ports.

Fig. 8 is a longitudinal view of the valve and its driving gear.

Fig. 9 is a view corresponding to Fig. 8 but with the valve shown partly in cross section, and its driving gear in a different position.

Fig. 10 is a section through the valve and shaft with the heat energy transfer ports at the instant of passage of hot gases through the valve from a working cylinder into a succeeding cylinder.

Fig. 11 shows the driving gears for the valve.

Fig. 12 shows an end view of the means for adjusting the timing of the valve.

Fig. 13 shows the outside of the valve.

Fig. 14 is a section through a modified form of valve.

Fig. 15 is a longitudinal section through the valve of my prior Patent #1,722,259 showing another form of balancing device.

Fig. 16 is a detail of the blades in the valve for breaking up the fuel mixture in the valve of Fig. 15.

Fig. 17 shows a section of the valve of Fig. 15 and shaft through which cross ignition and internal supercharging occurs.

Fig. 18 is a section through the valve of my prior Patent #1,722,258.

Fig. 19 is a sleeve for exhaust gases in valves of Figs. 20, 21 and 23.

Figs. 20 and 21 are details of ignition devices within a valve.

Fig. 22 is a section through the shaft and valve firing ports of Fig. 18.

Fig. 23 is a section of the jacketed exhaust valve.

Fig. 24 is a section through a modified form of valve and high tension ignition device shown in my prior Patent #1,722,257.

Fig. 25 shows a form of spontaneous ignition device for the valve of Fig. 24.

Figs. 26 and 27 are details showing the cross firing passage constructed in the valve of Fig. 24.

Figure 1:
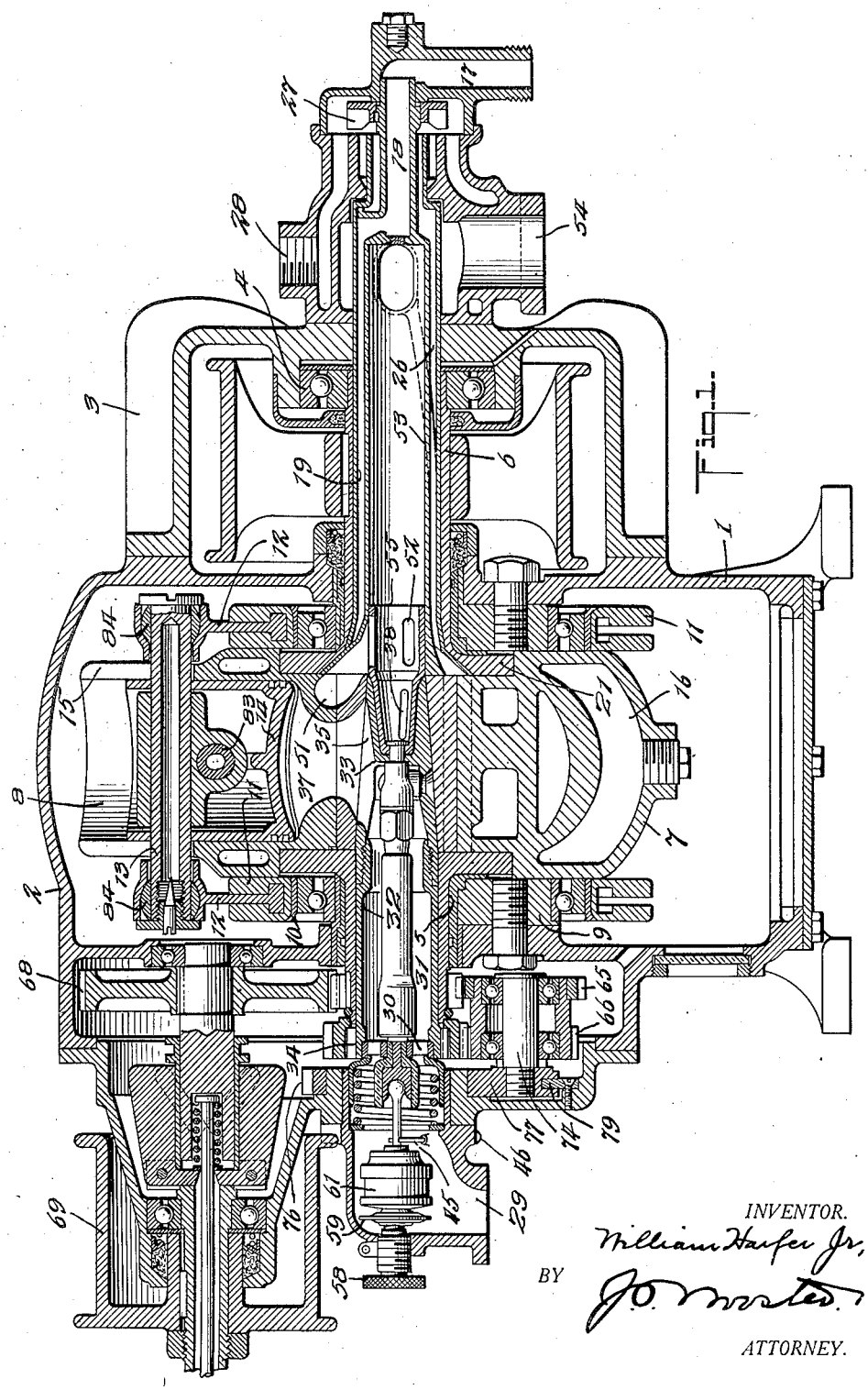
Fig. 1 is a longitudinal vertical cross section of the engine and valve.
Figure 2:
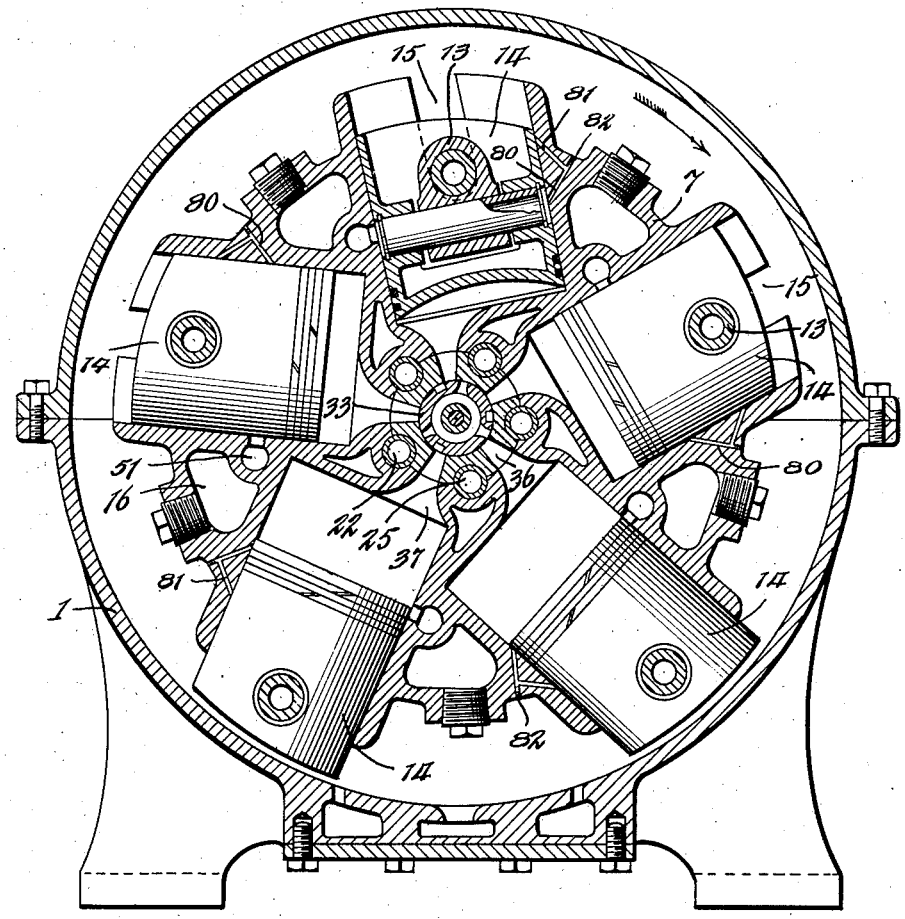
Fig. 2 is a transverse vertical cross section through the engine.

The engine shown in Figs. 1 and 2 comprises a base casing 1, having a removable top 2, and removable end casing 3 provided therein with bearings 4, 5, a rotor 7 with shafts 6, each of said shafts carrying a flange 21 at its inner end, said flanges 21 being fixed to a rotor casting 7. Thus the shafts 6, flanges 21, and rotor 7 turn as a unit. Cylinders 8 are preferably tangential to a circle concentric to the cylinder rotation, though they may be radial, said cylinders and shaft rotating as a unit in the casing 1, 3. Mounted on a fixed portion of the casing as the ring 9 is an eccentric ring 10, about which rotates a T-shaped track 11 in which the yokes 12 carrying wrist pins 13 connected to pistons 14 are secured. The wrist pins 13 project through the sides of the cylinders and slide in the slots 15. The T-shaped feet of yokes 12 slide in track 11 as it rotates, thus allowing the pistons to reciprocate. Water jacket space 16 is cored in the rotor casting surrounding the cylinders, as shown in Figs. 1 and 2 providing centrifugal water circulation, the water coming in through the pipe 17 passing through the passage 18 within the shaft extension 19 to the passage 20 in the flange 21 (Fig. 8), thence by key tubes 22, which key the rotor casting to the shaft 6, thence through the water jacket spaces around the cylinders, thence returning to the exhaust side of the cooling system through alternate key tubes 25, passage 26, pump 27, outlet 28 to a radiator or other cooler, and thence to the intake 17, providing a combined centrifugal and forced cooling circulation. As shown herein three of the key tubes 25 are exhaust tubes, and the remaining two key tubes 22 are inlet tubes, the volume of the exhaust water being slightly larger than that of the intake owing to expansion.

The charge inlet is by pipe 29 through the rotary mixing device 30 fixed to the valve sleeve 32. The fuel mixture then passes into the passage 31 within the valve sleeve 32 and into the tapered valve 33, through the supply ports 35 into the cylinders. The tapered valve carried by the sleeve 32 is driven by the valve driving gear 34, see Figs. 1 and 3. The tapered valve 33 is provided with three inlet ports 35, three exhaust ports 38, and three internal supercharging ports or cross firing nozzles 39 for the transfer of heat energy. Owing to the differential driving means for the valve, only three of each of such ports are necessary with the five-cylinder engine illustrated. Each valve port is adapted to register with the shaft ports 36, which are accurately machined and secured to register with the cylinder ports 37, see Fig. 2.

The heat tranfer or combustion chamber 40 formed between the ports 39 constitutes a heat reservoir and is preferably provided with spark contacts for starting ignition, which comprise the electrode 41 spaced a short distance from the grounded electrode 42. The supply current for the spark is carried by the electrode 43, plunger 44 held within its socket 47 in contact with rod 45 leading out to the terminal 46. To provide proper design of the heat transfer ports, nipples 48 shown in Figs. 3, 4 and 13 are screwed into the tapered valve for carrying the heat transfer ports 39. The chamber 40 is connected with each of these ports through a small expansion joint 49 constituted by a slidable connection between chamber 40 and nipples 48. The passages between chamber 40 and ports 39 are smaller than the chamber and larger than the ports in cross sectional area.

The exhaust occurs in three stages, first the ignition exhaust for internal supercharging or transfer of heat energy from the working cylinder through the ports 39 and chamber 40 to the second succeeding or compressing cylinder; secondly, the main exhaust which is through ports in the cylinder walls into the passage 51, thence through the ports 52 in the tubular supplemental valve body 55, carried by the valve 33, and, lastly, the residual exhaust through cylinder head ports 37, shaft ports 36, exhaust ports 38 in the valve 33. The residual exhaust through the cylinder heads and the main exhaust through the passage 51 both pass out through the exhaust passage 53 in the shaft, and thence out the pipe 54 leading from the engine. The exhaust passages 51 are curved to permit of water jacketing between them. The additional tubular valve 55 controlling the main exhaust is desirable to prevent back firing in a 4-cycle engine because the ports in the cylinder walls are opened and closed by the piston once each revolution. This supplemental valve 55 prevents exhaust gas being drawn into the cylinder just before the completion of the suction stroke. This valve 55 like the main valve 33 requires only three ports 52 because the valve is differentially driven with main valve 33 in the 5-cylinder engine illustrated. The tubular valve 55 need not be as tight and close a fit as the main valve 33. Scavenging of the cylinders is accomplished by the inward stroke of the piston through the cylinder ports 37, shaft ports 36 and exhaust ports 38 in the conical valve body 33.

The internal-supercharge or regeneration is timed by manual means described later. With this engine it is possible to transfer a portion of the incandescent charge from a working cylinder to a succeeding cylinder before the latter cylinder is at the completion of its compression stroke and it is possible to have this heat transfer occur as much as 80 circular degrees in advance of the innermost point of the piston travel. In the working cylinder the heat energy transfer occurs anywhere from roughly one-third to a half and often two-thirds of the power stroke, though it may occur earlier or later in the power stroke provided the pressure in the successively fired cylinder be not greater than that of the hot gases transferred, The conical valve body 33 is held seated by the springs 56 and 57 controlled by the thumb screw 58 but cushioning of thrusts on the valve due to unbalanced pressure is taken up largely by the diaphragm 59 connected with the hydraulic cylinder 61 and piston 60, illustrated in Fig. 3. Thrusts such as that due to cylinder pressure on the valve taper forcing the valve to the left in Figs. 1 and 3 are taken up by this diaphragm and cylinder. Either the piston may be loosely fitting to permit a slow passage of liquid past it or, as is the case here, small perforations, not shown, are provided in the piston. The insulating bushing 62 and insulated sleeve 63 protect the current going to the spark plug, and the bushing 62 also is arranged to transmit thrusts of the valve.

In Figs. 4 and 10 are shown the preferred form of valve having its ports 39 so proportioned with regard to the cylinder ports that the portion of a charge extracted is cut off from the working cylinder before the combustion chamber is connected to the successively fired cylinder. In Fig. 14 is shown a modified valve having its ports 39$^a$ slightly wider whereby the working and succeeding cylinders are connected but only for an instant and before any back flow of heat into the working cylinder can occur.

Differential driving of the valve is accomplished from the shaft driving gear 64 through connected gears 65 and 66 to outside gear 67; the gear 67 has external twisted teeth and a set of internal spline-like projections 70. The valve is provided on its periphery with a member 34 which is made up of a set of spline-like projections 71, the projections 70 and 71 cooperating to drive the valve. Power is conveyed from the shaft through its gear 64 to the gear 68 connected with the driving pulley 69. For automatically unseating the valve 33 with increase in its driving torque the spline-like projections 71 are twisted in such fashion that they have a slight sliding motion on the twisted projections 70. From this it results that the longitudinal components of thrust are unbalanced, and there will be a tendency to thrust the valve to the left upon any increase in driving torque due to valve sticking, etc. In order to partially balance lateral thrusts in some of the transmission gears they are made with twisted teeth oppositely arranged.

As shown in Figs. 8 and 9 the driving shaft is provided with a shoulder 72 normally contacting with the flange 73 of the gear 67. In this position the gear 67 is ready to slightly unseat the valve 33 by moving it to the left on increase of driving torque. In case of the engine turning in the wrong direction and to prevent the twisted gears from jamming the valve on its seat, the gear 67 is made slightly slidable so that after turning a portion of a revolution in the wrong direction it assumes the position shown in Fig. 9, when flange 73 is out of contact with the shoulder 72, but engaging the member 34 on the valve sleeve 32 to avoid shifting the valve to the right and prevent its jamming in its seat.

As shown in Figs. 11 and 12, to adjust the timing of the valve a lock nut 78 is released to enable rotation of the gear 75 engaging teeth 76 on the member having a projection 77 carrying the auxiliary shaft 74 on which are mounted the gears at 65 and 66. Shifting the position of the auxiliary shaft 74 will shift the angular relationship between the valve ports and the shaft ports or adjust the timing of the valve. The guide frame 79 fitting in a slot in the projection 77 holds said projection in line.

The engine is oiled by centrifugal force; the rotary motion given the supply charge fed in through the inner space 31 of the valve sleeve 32 by the mixing device 30 causes any liquid oil particles to be separated out and to fall into the bottom of the space 31. From there oil grooves lead the oil thus separated into helical grooves on the outside of the valve sleeve, as shown in Fig. 8 for example. These grooves are arranged to force the oil to the right toward the tapered portion of valve 33, where substantially straight longitudinal grooves shown in Fig. 13 keep the valve lubricated.

To remove excess oil from the cylinders into the casing and to lubricate the piston, liquid oil particles are centrifugally separated and pass into the oil passage 80 shown in Fig. 2 when this passage is uncovered by the piston. A plug 82 closes the end of passage 80 while communicating passage 81 leads into the casing and cylinder beyond the piston. The passage 82 leads from the leading side of the cylinder wall where centrifugal force is a maximum in enabling the oil to be separated. In order that the exhaust may be as dry as possible the exhaust passage 51 leads from the lagging side of the tangentially arranged cylinder. The passages 80 and 81 leading into the cylinder are spaced far enough apart so that both of said passageways are not uncovered by the piston at the same time; as the piston moves outwardly oil collects in passages 80, and as the piston moves inwardly uncovering the mouth of 81 the oil then discharges from 80 and 81, spurts out into the casing under the influence of centrifugal force and provides the necessary piston lubrication.

In order to equalize the wear on the yokes 12 carried by the wrist pin 13 and prevent one yoke from carrying most of the load, means are provided for equalizing the pressure on each yoke. This is done by the provision of a pivotal wrist pin support 83, enabling the wrist pin 13 to oscillate about support 83 in order to equalize the pressure on the yokes. In the ends, the wrist pins are provided with a spherical bearing 84 shown in Fig. 1.

This engine embodies a number of distinctive characteristics among which may be mentioned the increase in thermal efficiency due to successive internal supercharging or regeneration by the transfer of hot gases from a working cylinder into a successively fired cylinder. An essential of successive internal supercharging by heat energy transfer is that the path shall be a minimum in distance in order to keep from unduly cooling the hot gases, because the temperature of these heated gases is very high when occurring in the early part of the power stroke and considerably above the relatively low temperature of the exhaust. The passages for the transfer of this heat energy have been so constructed as to absorb a minimum amount of heat. In fact so little heat is absorbed that the heat energy transfer is of an increasing quantity with each successively fired cylinder, resulting in acceleration in engine speed with increase in temperatures and mean effective pressures up to the structural limitations and speeds for which the engine is designed, necessitating a possible adjustment of timing to keep from further increasing speed and pressures above safe limits. Instead of a change in timing to stop the acceleration, control of the throttle valve will serve the same purpose. Another characteristic of the heat transfer ports is their relatively narrow width and short length. By having the ports of short length the amount of wall space in contact with the hot gases is a minimum. Owing to the excessive temperatures encountered the heat transfer ports 39 and the chamber 40 are made preferably of chromel metal, a high chromium nickel alloy which is not affected by the heat, being non-oxidizing and of low coefficient of expansion. Another feature contributing to the absorption of a minimum amount of heat by the heat transfer and cross igniting passage and chamber is the arrangement of these parts as shown in Figs. 4 and 10 within the valve and spaced from the walls thereof so that there is little heat conduction from the chamber 40 to the valve walls. Also the chamber 40 is surrounded by a space through which the incoming fuel charge is passed with the result that the temperature of the chamber 40 is kept down.

With this invention the valve may be cooler and the heat transfer passage hotter than in any previous construction, the temperature of the transferred charge may be as high as a thousand degrees above the exhaust temperature. In this invention the chamber 40 is made relatively small which cuts down the hot wall surface capable of absorbing heat and there are also no pockets of dead gases to interfere with the transfer of heat. Though not limited to any particular type of starting ignition the location of the spark plug within this chamber 40 so that the rapid passage of hot gases from one cylinder into a second succeeding cylinder is past this plug, helps keep it clean. Timing of this spark plug is controlled in the usual manner by an adjustable timer.

A further advantage of this invention is the location of the heat transfer ports 39 in that portion of the tapered valve, which, when considered in relation with the supply and exhaust ports 35 and 38 respectively, results in overcoming local heating and in maintaining the taper constant, so that uniform wear results and the angle of the taper does not change. The relative location of the heat transfer ports 39 with respect to the supply and exhaust ports will be seen, and it will also be seen that the ports 39 are longitudinally and transversely nearer the supply ports than the exhaust ports, with the result that only a portion of the exhaust gases are responsible for the expansion at the small end of the tapered valve, while the heat losses from the transfer ports 39 and chamber 40 are largely responsible for the expansion at the large end of the valve.

Another feature of this invention is the simplicity of construction of the cushioning means used for taking up thrusts on the tapered valve necessitating relatively few parts.

The pulley shown at the right in Fig. 1 is mounted on a shaft rotating with the cylinders. Adjacent to pulley 69 at the left of Fig. 1 is shown a governor which controls the supply of fuel charge to the engine. The ignition circuit supply wire is attached to the contact terminal 46, while the other is grounded.

Internal supercharging by adding enough heat to a succeeding cylinder taken from a working cylinder during an early portion of the power stroke, raises the temperature and mean effective pressure in the cylinder receiving the heat, and this increase in temperature and pressure increases both the thermal and mechanical efficiency of the engine. The engine of the type illustrated is also adapted for additionally supercharging by the application of increased pressure to the supply charge fed into the cylinders. While external or supercharging in this last mentioned manner is not satisfactory in many engines on account of the loss in energy from stopping and starting columns of gas or changing their direction, such is especially adapted for an engine of the type illustrated because the supply fluid is fed continuously into the engine without changing its direction, some one or more intake ports being always open and the direction of the fuel charge is always the same and whirling as it travels through the valve sleeve within the shaft. It will thus be seen that the engine of this invention is particularly adapted for large loads, considering its size, by reason of its being applicable to two kinds of supercharging, namely, external supercharging or that due to increase in pressure of the supply fluid and also internal supercharging or regeneration resulting from the addition of heat taken from previously fired cylinder.

Referring to the valve of Fig. 15, although there is not much longitudinal thrust in a conical valve from cylinder pressure, it is found that a relatively heavy spring 121 is required in a high pressure engine to hold the valve down. By balancing out this thrust, a lighter spring can be used, the valve stays down instead of vibrating in and out of the seat, and less driving power is used.

The valve ignition rod has a slot 110 through the insulation 111 to admit cylinder pressure to the annular space 112 thence by port 113 to balancing cylinder space 114. The head 115 is directly on the valve body and transmits the thrust to the forward (right) end of the valve through nipples 48$^c$. The head 116 slides on tube 117 but thrusts against shoulder 118 on body 119 which slides through vane ring 30$^c$ and thence through thrust bearing 120 to engine frame 65. The tube 119 slides over the cylinder body, and sliding head 116 has a packed fit as shown in the cylinder body. The sliding movement of head 116 relatively to shoulder 118 provides for expansion, and wear of the valve in the seat. The cylinder pressure thrust on the valve is thus balanced out, leaving the seating pressure practically determined by the tension of spring 121. The balancing pressure is determined by the area of cylinder head 115, to be more or less than the cylinder pressure tending to unseat the valve by overcoming spring 121. The present construction is of especial advantage in an elongated conical valve of relatively slight taper, but is applicable to all types of rotary conical valves wherein unseating from cylinder pressure may occur. By tapering the block 122 to enlarged ends as shown, the oil tends to centrifugally travel towards the ends and lubricate the block ends in blocks 123, 124. The round ended block 122 also permits slight disalignment due to bearing or valve wear, etc., without getting out of order.

The valve of this and the preceding figures is mostly oiled by centrifugal force as was described in connection with the valves of my other applications. In the matter of unseating and adjusting the valve for timing during rotation, also in the cross ignition function, the valve is similar to that described in the preceding figures.

Fig. 17 is a section through the valve of Fig. 15 showing the inlet ports 35$^c$, the cross firing ports 39$^c$ leading to the combustion chamber 40$^c$ spaced from the valve body 33$^c$. As with the valve of the preceding figures, the combustion chamber is secured in position by ported nipples 48$^c$ screwed into the valve body and having a sliding fit within the combustion chamber 40$^c$ to constitute an expansion joint. In Fig. 17 the exhaust ports 38$^c$ that are shown in dotted lines and the shaft 6 surrounding the valve and containing the shaft ports 36$^c$ are shown in Fig. 17, but not in Fig. 15 for the sake of clearance. As shown in Figs. 15 and 17, the supply charge surrounds the combustion chamber and prevents excessive heat absorption by the valve body, inasmuch as the combustion chamber is spaced from the valve body. From Fig. 17 it will be seen that the cross fire path is substantially a straight line between the cross ignition ports 39$^c$.

Referring to Fig. 18, the tubular taper valve 33$^b$ of my Patent # 1,722,258 is shown as having a spring 131 adjusted by the nut 132 which exercises pressure through an interposed tubular rod 133 ending in a ball thrust bearing 142 against a tube 143 carried by the ring 144 on the valve sleeve 32$^b$, tending to push the valve 33$^b$ to the right in Fig. 18 onto its seat. The gear 34$^b$ is of the skew type so that the axial thrust of the gear opposes the thrust of the spring 131. When the engine is cold, these two forces will about be balanced, so that the tapered valve will be thrust very lightly, into the tapered seat in shaft 6$^b$. When the valve heats up and expands with tendency to bind in the taper, the power required to drive it increases to such extent as to cause the skew gears to push the valve backwards against spring 131 until the friction due to expansion is relieved, thereby permitting the valve to always drive easily and at the same time permitting the spring 131 to hold it on its seat, irrespective of temperature, as is the case with the valve of the preceding figures. In Fig. 18, the valve is so designed that all of the exhaust takes place through the exhaust ports 38$^b$ and none through the sides of the cylinder around the valve. As shown in Figs. 18 and 23, the lining 145 is inserted in the exhaust passage of the valve, the valve body around its lining being recessed to form dead gas spaces 149 having the effect of heat insulation, so that a less amount of heat is absorbed by the valve body at this portion than would be the case if the valve body were of solid metal. Passages 146 are the water inlet passages shown in Figs. 18 and 22, while passages 147 shown in Fig. 22 are the outlet for the hot water from the cylinder jackets, as described more fully in my prior Patent #1,722,258 where the complete engine is shown. The valve 33$^b$ of Figs. 18 to 22 is provided with supply ports 35$^b$, exhaust ports 38$^b$ and the cross firing ports 39$^b$ leading into the combustion chamber 40$^b$ within the valve body, as shown in Fig. 18. As is the case with the preceding valves, oil contained in the fuel supply is centrifugally separated out within the valve sleeve 32$^b$ and passes through one or more oil holes to the outside of the sleeve whence helical grooves pass the oil down onto the tapered portion of the valve body for lubrication, so that the valve rotates within a film of oil between it and its seat. Referring to Fig. 9, the space at the right end of the valve chamber beyond the cross firing passages will contain combustible charge mixed with vaporized oil, and centrifugal force will throw the oil outward to lubricate the extreme tapered portion of the valve, this oil going into the valve ports which happen to be closed, whereas the charge will be deflected and drawn equally through the valve inlet port and the cylinder port into the cylinder. This is a very important feature in enabling the extreme end of the valve to be properly lubricated and also giving equal flow of charge throughout the port length to the cylinder. The ignition device shown in Fig. 18 comprises a contact or catalytic device located in the combustion chamber 40$^b$ and connected with a small auxiliary source of combustible gas, so that combustible gas is always drawn through the device toward the engine cylinder during the suction stroke, tending to cause the device to incandesce and thereby causing ignition from the combustion chamber at the proper time, the device being so constructed that there is always a stream of fresh gas being drawn through. The igniter consists of a quartz tube carrying finely divided platinum which will automatically heat up in a current of hydrocarbon gas, the platinum being enclosed in a capsule which projects into the combustion chamber. 134 is the gas supply for the igniter controlled by valve 135, thence going through tube 136 and tube 133 into tube 143 which is connected by couplings, as shown, to the igniter casing 138 threaded into the valve body 33$^b$. 139 is the capsule which becomes incandescent and is positioned in the combustion chamber 40$^b$ and carried by the igniter body 138. Within the body 138 and spaced from the tubular lining 137 thereof is a quartz tube 148 through which the gas passes and containing at its forward end spongy platinum. The igniter body has a hole 140 opening into the main gas inlet space within the valve sleeve whereby the suction stroke produces sufficient gas flow through the quartz tube into the capsule and thence out through the hole 140, so that the capsule becomes incandescent and will fire the gas in the combustion chamber whenever the proper compression is reached, which is at the time when a cross fire should occur if the engine is already running or when a cylinder should be fired in starting. Ordinarily, the heat of compression due to cranking the engine a few times will dry out the igniter so that it will start automatically, but in case it should not, a small electric heating wire 141 can be run through to be heated by a current to dry the capsule until it can incandesce and the current then be cut off.

The hole in the quartz tube is sufficiently small so that the velocity of the suction gas is greater than the back fire flame speed thus preventing the gas from being burned in the tube and it only burns at the tip. A gauze wire screen in the quartz tube would also prevent back fire. The fresh gas is superheated from the exhaust of gas previously burned in the tube, causing the capsule to become very hot. The quartz tube projects into the capsule as shown, bringing the end of the tube to the tip of the capsule so that the primary combustion of the gas is directly in contact with the interior of the capsule. The contact platinum within the capsule may be in the form of a fine coil of wire or in spongy platinum sufficiently divided so as to permit the gas to pass through as may be desired. One convenient way is to apply finely divided platinum to quartz fibre which will hold the former suspended. If the gas velocity is greater than the flame travel, the speed of gas decreases owing to the increase of space within the end of the capsule as compared with the diameter of the quartz tube. The capsule being exposed to the compression conditions of the engine, retains compression heat. The timing can be varied by throttling the gas at valve 135, which valve will also control the temperature of the platinum.

In Fig. 20 is shown another form of contact igniter in which a platinum capsule 150 is carried by plug 151 in the exhaust chamber, the plug 151 also carrying a tube 152 so that gas from the ignition is always moving through the port 153 in the capsule and out through the tube 152, thus causing the active material 154 to heat up and thus heat the capsule. Spongy or finely divided platinum, or platinum mixed with oxides of thorium, cerium, etc., may be used, as such oxides tend to attract oxygen from the air.

In Fig. 21 is shown a form of high tension ignition device in which the rod 155 is counter bored in its end as shown to form a recess and the plug 156 has a chamber 157 which is closed by a conical cover 158 having a small hole 159 in the end registering with the counter bore in the rod 155. The ignition of the engine compresses the gas in the chamber 157, which at the time of ignition is expanding and flowing out through the hole 159 at the time the spark jumps, the effect of this blast gas through hole 159 being to spread or fan out the arc laterally, thus giving a much quicker and better body of gas to be ignited, because of the spreading out of the flame. The gas pulsating in and out of chamber 157 and counter bore in rod 155 causes these openings to clear themselves and the residue of burned gas therein becomes immaterial, since one volume of burned gas at atmospheric pressure will be compressed many times at the ignition pressure, hence the counter bore in rod 155 and the chamber 157 necessarily receive fresh gas at each compression.

Fig. 24 shows a type of valve of my prior patent No. 1,722,257 provided with high tension ignition wherein the tube 160 is straight and abuts against a block 161 carried by the tube 162 threaded into the valve 33ª and closing the chamber 40ª at one end. Mounted in the block 161 is insulation such as wrapped mica 163 carrying the contact 164, the current jumping to a contact screw 165 in the plug 166 forming the other end of the ignition chamber 40ª, with the contact 165 adjustable for length of gap. The contact 164 is carried by a plug 167 to which is secured by a clip 168 a rod 169 extending outwardly into the supply passage 29ª and engaging in a conical spring pressed block 170. This spark plug and all the mechanism associated therewith must turn with the valve so that the cone plug 170 forms a bearing on which the rod 169 turns. From the plug 170 the current goes out through suitable conductors to a binding post 171 to which is attached the conductor from the magneto. The distributor for the magneto will have a commutator with contact segments which will be so spaced as to complete the circuit at the proper times, or else will be driven at such speed with a single segment as to do this. In the present case, the ignition sparks will be produced at about the same times that the cross firing ignition occurs, or the make and break, giving one spark in approximately each 120° of valve revolution.

Fig. 25 shows a type of catalytic ignition device similar to that shown in Fig. 20 except that the valve of Fig. 25 does not have any dead gas space heat insulation around the exhaust passage.

Fig. 26 shows the valve of Fig. 24 with the high tension ignition means removed. This valve it will be noted is cylindrical instead of tapered, and is driven and lubricated in the same manner as the valves of the previous figures, it being adjustable for timing during rotation.

Fig. 27 shows a cross section of the valve 33ª showing the cross ignition ports 39ª and combustion chamber 40ª in cooperation with the shaft ports 36ª but not showing the exhaust or supply ports, these being arranged in substantially the same manner as in the previous valves. The cross ignition ports 39ª, enlarged, as shown in Fig. 26, are to avoid quenching effects by enabling the flame to fan out into and through the shaft ports. This valve, like the ones of the previous figures, is differentially driven with respect to the cylinders or rotor, whereby a less number of valve ports are required than the number of cylinders, and with the five cylinders of the engine illustrated in the previous figures, and the valve having three inlet, three exhaust and three cross ignition ports, it need only rotate one-sixth slower than the speed of rotation of the cylinders with the result that wear is considerably lessened, and a better fit obtainable. Another advantage is that reduction in the number of valve ports gives more room for necessary valve lap.

This invention is not to be restricted to the five cylinder and three port valve shown, as other numbers of cylinders may be used with proper differentiation between angular cylinder velocity and angular valve velocity. Thus, a seven cylinder engine can be operated with a four port valve if driven at one-eighth less angular velocity than the cylinders, but increase in the number of cylinders tends to increase the size and diameter, tending to lengthen the gas travel.

I claim:

1. In a multiple-cylinder combustion engine, a rotary valve having a plurality of transverse internally connected cross fire passages, means for driving said valve, and means for adjusting the timing of the valve during rotation.

2. In a multiple-cylinder combustion engine, a valve of circular cross section having a supply and exhaust port and a closed cross fire passage extending axially through the valve internally of said supply and exhaust ports and connecting spaced ports of restricted area compared with said supply and exhaust ports.

3. In a multiple-cylinder combustion engine, a valve of circular cross section, supply and exhaust ports arranged in pairs around the valve periphery, passages through the valve connecting like ports, cross fire ports between said pairs of ports, and a passage through the valve connecting said cross fire ports.

4. In a multiple-cylinder combustion engine, a valve of circular cross section having more than two cross fire ports uniformly spaced about the valve periphery and passages through the valve connecting said ports to a common closed chamber.

5. In a multiple-cylinder combustion engine, a rotary valve having a transverse cross fire passage therethrough, driving means for the valve, and means to adjust timing of the valve during its continued rotation.

6. A combustion engine valve containing a plurality of peripheral ports, passages connected to said ports, spline-like projections on said valve, a co-axial driving member cooperating therewith, intermediate gears driving the valve at a different speed from the co-axial driving member, and means for moving said intermediate gears about said driving member to vary the angular relationship between said co-axial driving member and valve ports.

7. A combustion engine rotary valve having a plurality of peripheral ports, passages through the valve connected to said ports, driving means for the valve, a tube between said valve and its driving means, means for supplying oil to the inside of said tube, a recess on the inside of the tube for accumulating oil, an oil passage leading from the said recess to the periphery of the tube whereby oil is fed to the periphery by centrifugal force, and a helical groove leading from said passage to the portion of the valve containing said ports.

8. In a multiple-cylinder combustion engine, a rotary valve having a plurality of each of separate supply and exhaust ports, longitudinal supply and exhaust passages connected to their respective ports, at least as many cross fire ports on the valve periphery as there are supply ports, there being a supply port, exhaust port, cross firing port, etc., around the valve in the direction of rotation.

9. In a multiple-cylinder combustion engine, a valve having a tapered portion and cross fire means through the tapered portion, a valve seat, means for holding the valve on its seat, means for driving the valve, and automatic means for longitudinally shifting the valve against said holding means on increase in its driving torque without substantially changing its timing.

10. In a multiple-cylinder combustion engine, a valve having a tapered portion provided with a plurality of supply and exhaust passages therein, a valve seat, means for holding the valve on its seat, means for driving the valve, and means responsive to increase in its driving torque for longitudinally shifting the valve against said holding means without substantially changing its timing.

11. In a multiple-cylinder combustion engine, a valve having a tapered portion through which extends a transverse closed cross fire passage connecting spaced ports, a valve seat, means for holding the valve on its seat, means for driving the valve, and means responsive to increase in its driving torque for longitudinally shifting the valve against said holding means.

12. A heat engine valve having a tapered portion on which supply and exhaust ports are arranged in pairs around the valve periphery, passages through the valve connecting said ports, a valve seat, means for holding the valve on its seat, means for driving the valve, and means responsive to increase in its driving torque for longitudinally shifting the valve against said holding means.

13. In a multiple-cylinder combustion engine, a valve having a tapered portion provided with more than two cross fire ports uniformly spaced about the valve periphery, passages through the valve connecting said ports, a valve seat, means for holding the valve on its seat, means for driving the valve, and means responsive to increase in its driving torque for longitudinally shifting the valve against said holding means.

14. In a multiple-cylinder combustion engine, a valve having a tapered portion provided with more than two cross fire ports uniformly spaced about the valve periphery, passages through the valve connecting said ports, a valve seat, means for holding the valve on its seat, means for driving the valve, means responsive to increase in its driving torque for longitudinally shifting the valve against said holding means, and means for adjusting the timing of the valve during rotation.

15. A heat engine valve having a tapered portion provided with a plurality of each of supply and exhaust ports, arranged in pairs around the valve periphery, passages through the valve connected to said ports, a valve seat, means for holding the valve on its seat, means for driving the valve, means for adjusting the valve timing during rotation, and means responsive to increase in its driving torque for longitudinally shifting the valve against said holding means.

16. In a multiple-cylinder combustion engine, a valve having a tapered portion provided with transverse cross fire passage and an exhaust passage, and means around a portion of at least one of said passages for lessening heat absorption by the valve body from said passage.

17. In a radial cylinder combustion engine a rotary, driven, tapered valve having cross fire ports on its tapered portion, a valve seat, means for holding the valve on its seat, means for supplying oil between the valve and its seat, and means for longitudinally shifting the valve against said holding means on increase in its driving torque.

18. A combustion engine tapered valve, a valve seat, means for holding the valve on its seat, a hot gas passage through the valve, means for longitudinally shifting the valve against said holding means on increase in its driving torque, said last mentioned means including spline-like projections on said valve, and another set of spline-like members cooperating therewith and arranged to longitudinally shift said valve.

19. In a multi-cylinder combustion engine, a tapered valve having peripheral ports on its tapered portion, passages through the valve connected to said ports, a valve seat, and fluid pressure means for balancing the valve against unseating by pressure on its tapered portion, said fluid pressure means being responsive to cylinder pressure.

20. A tapered valve having peripheral ports on its tapered portion, passages through the valve connected to said ports, a valve seat, fluid pressure means for balancing the valve against unseating by pressure on its tapered portion, means for driving the valve, and automatic means for longitudinally shifting said valve on increase in its driving torque without substantially changing its timing.

21. In a multiple-cylinder combustion engine, a valve provided with transverse internally connected cross fire passages enlarged at their junction, and means between at least a portion of said passages and the valve body for transfer of the incoming charge, thereby lessening heat absorption by the valve body and heating said incoming charge.

22. In a radial multi-cylinder combustion engine, a valve provided with transverse internally connected cross fire passages connecting ports distributed transversely about the valve periphery and shaped to provide transfer of a flame between ports.

23. In a radial multi-cylinder combustion engine, a valve provided with transverse internally connected cross fire passages connecting ports distributed about the valve periphery and shaped for flame transfer at an angle of bending substantially less than 90°, and means to lessen heat absorption by the valve body from said passages.

24. In a radial multi-cylinder combustion engine, a valve provided with a closed cross fire passage connecting transversely spaced ports and provided with a gas space about at least a portion of said passage to lessen heat absorption by the valve body from the passage.

25. A combustion engine valve provided with exhaust ports transversely disposed around the valve periphery, a supplemental valve having additional exhaust ports longitudinally spaced from and independent of the valve ports, and an exhaust passage connecting the ports in the valve and supplemental valve.

26. In a radial multi-cylinder combustion engine, a tapered valve provided with a closed cross fire passage through the tapered portion connecting transversely spaced ports, means between said passage and valve body to lessen heat absorption by the valve body, a seat for said valve, means for holding the valve on its seat, and means responsive to increase in its driving torque for longitudinally shifting the valve.

27. In a multi-cylinder combustion engine, a tubular valve having a combustion chamber spaced from the valve body, and ported nipples passing through the valve and holding said combustion chamber in position, said ported nipples also serving as passages for firing the cylinders from the combustion chamber.

28. In a multi-cylinder combustion engine, a tapered, rotary valve having a plurality of cross fire ports transversely distributed about its peripihery in its tapered portion, and unrestricted passages connecting said ports for flame transfer between cylinders.

29. In a multiple-cylinder combustion engines, a tapered valve having cross fire passages through and adjacent one end of the tapered portion, and means for heating the other end of said tapered portion to maintain valve expansion and hence the valve taper substantially constant.

30. In a multiple-cylinder combustion engine, a tapered rotary valve provided with transverse cross fire passages through the tapered portion adjacent one end, and exhaust passages arranged to heat the rest of the valve in such manner as to maintain valve expansion and hence the taper substantially constant.

31. In a multiple-cylinder combustion engine, a tapered valve having in its tapered portion supply passages, exhaust passages and cross fire passages longitudinally nearer the supply than the exhaust passages.

32. In an internal combustion engine, a rotary, driven valve having a taper, a valve seat, means for holding the valve on its seat, means for driving the valve, means for longitudinally shifting the valve on increase in its driving torque against said holding means, and means to prevent jamming the valve on its seat on rotation in the opposite direction.

33. In a multi-cylinder combustion engine, a rotary valve provided with a taper, a valve seat, means for holding the valve on its seat, means for longitudinally shifting the valve on increase in its driving torque, and means to prevent jamming the valve on its seat on rotation in the opposite direction, said last two mentioned means including curved projections on said valve, a concentric member cooperating with said projections, means for driving said concentric member, a stationary abutment against which said concentric member is adapted to engage on rotation of the valve in its normal direction, and lateral means engaging said valve and concentric member on rotation of the valve in the reverse direction.

34. In a multiple-cylinder combustion engine, a rotary valve provided with a plurality of each of supply and exhaust ports arranged in pairs about the valve periphery, cross firing ports between said pairs and positioned nearer the supply than the exhaust ports of each pair.

35. In a multiple-cylinder combustion engine, a valve provided with a taper and having on its tapered portion a plurality of longitudinally overlapping supply and exhaust ports, longitudinal passages connected to the supply ports, and longitudinal passages extending in the opposite direction through the valve and connected to the exhaust ports, transverse cross fire passages between said supply and exhaust passages, and extending below said supply and exhaust ports, said cross fire passages being adjacent that end of the tapered valve through which the supply passage enters.

36. In a multiple-cylinder combustion engine, a valve provided with a taper, and having through its tapered portion transverse internally connected cross fire passages, means between the valve body and passages to lessen heat absorption, by the former from the latter, a valve seat, means for balancing the valve against pressure on its tapered portion, and means for longitudinally shifting the valve on increase in its driving torque.

37. A combustion engine valve provided with a taper, and having through its tapered portion transverse internally connected cross fire passages, means between the valve body and passages to lessen heat absorption by the former from the latter, a valve seat, means for balancing the valve against pressure on its tapered portion, means for longitudinally shifting the valve on increase in its driving torque, and means to prevent jamming the valve on its seat on rotation in reverse direction.

38. In a multiple-cylinder combustion engine, a valve having transverse cross fire passages spaced from the valve body and a fuel supply passage surrounding at least a portion of said passages to prevent heat absorption by the valve and to preheat the incoming fuel.

39. A combustion engine valve having transverse internally connected cross fire passages, and ports on the valve periphery connected by said passages, said passages being a minimum cross sectional area at said ports and of considerably increased cross sectional area inwardly of the valve.

40. In a multiple cylinder combustion engine, a valve, and a plurality of transverse cross fire passages in said valve which are internally connected by a chamber enlarged with respect to said passages.

41. In a multi-cylinder internal combustion engine, a rotary valve, and a plurality of transverse cross fire passages in said valve which are internally connected by a chamber enlarged with respect to said passages.

42. In a radial multi-cylinder combustion engine, a valve having a plurality of cross fire passages for firing one cylinder from another, said passages intersecting a common, internal, enlarged chamber.

43. In a multi-cylinder combustion engine, a valve, a closed chamber within said valve, and spaced cross fire ports connecting the chamber with the external surface of the valve.

44. In a radial multi-cylinder combustion engine, a rotary valve, an internal closed chamber within said valve, spaced ports on the periphery of said valve, and cross fire passages connecting said ports with said chamber for firing one cylinder from another.

45. In a multi-cylinder combustion engine, a valve having more than two cross fire ports uniformly spaced about the valve periphery, and intersecting passages through the valve connecting said ports, said passages being short and substantially straight to provide for sudden transfer of an uncooled flame.

46. In a multi-cylinder combustion engine, a valve having a plurality of transverse internally connected cross fire passages for firing one cylinder from another, an axial chamber at the junction of said passages, and cross fire ports at the external ends of said passages for permitting substantially continuous heating of said chamber by the cross fire flame.

47. A tubular valve having a passage therethrough, projections fixed on said valve, a driving member cooperating therewith, driving gear for said member, and means for rotating the driving gear about the valve member to change the timing of said valve.

48. In a multi-cylinder combustion engine, a valve provided with a cross fire chamber, spaced from the valve body by ported nipples, and an expansion joint formed by the nipples and chamber.

49. In a multi-cylinder combustion engine, a valve having a tapered portion provided with supply passages, and transverse cross fire passages internally connected to a chamber, expansion joints in said passages, and a gas space between the internal chamber and valve body to lessen heat absorption by the latter.

50. In a heat engine having a hollow main shaft, a valve within said shaft provided with supply and exhaust ports arranged in pairs around its periphery, driving means for said valve, and means for controlling the angular relationship between said driving means and said valve.

Signed at New York, in the county of New York and State of New York, this 11th day of April, A. D. 1927.

WILLIAM HARPER, Jr.